United States Patent
McNamee et al.

(10) Patent No.: US 6,699,021 B2
(45) Date of Patent: Mar. 2, 2004

(54) PASSIVELY PUMPED LIQUID FEED FUEL CELL SYSTEM

(75) Inventors: George C. McNamee, Loudonville, NY (US); William P. Acker, Rexford, NY (US)

(73) Assignee: MTI MicroFuel Cells Inc., Albany, NY (US)

( * ) Notice: Subject to any disclaimer, the term of this patent is extended or adjusted under 35 U.S.C. 154(b) by 0 days.

(21) Appl. No.: 10/299,286

(22) Filed: Nov. 19, 2002

(65) Prior Publication Data

US 2003/0095872 A1 May 22, 2003

Related U.S. Application Data

(62) Division of application No. 09/717,754, filed on Nov. 21, 2000, now Pat. No. 6,645,655.

(51) Int. Cl.$^7$ ............................. F04B 43/06; H01M 2/14
(52) U.S. Cl. ........................ 417/379; 417/394; 417/395; 429/39
(58) Field of Search ................................ 417/379, 398, 417/392, 394; 429/34, 38, 39

(56) References Cited

U.S. PATENT DOCUMENTS

| | | | |
|---|---|---|---|
| 2,952,217 A | * 9/1960 | Lindbom | 417/395 |
| 3,468,713 A | * 9/1969 | Mueller | 429/14 |
| 4,046,956 A | 9/1977 | Fanciullo | |
| 4,572,876 A | 2/1986 | Spurrier | |
| 4,593,534 A | 6/1986 | Bloomfield | |
| 4,673,624 A | 6/1987 | Hockaday | |
| 4,810,597 A | 3/1989 | Kumagai et al. | |
| 5,523,177 A | 6/1996 | Kosek et al. | |
| 5,573,866 A | 11/1996 | Van Dine et al. | |
| 5,599,638 A | 2/1997 | Surampudi et al. | |
| 5,631,099 A | 5/1997 | Hockaday | |
| 5,723,228 A | 3/1998 | Okamoto | |

(List continued on next page.)

FOREIGN PATENT DOCUMENTS

| | | |
|---|---|---|
| GB | 1114489 | 5/1968 |
| GB | 2010385 | 6/1979 |
| WO | 01 54216 | 7/2001 |

OTHER PUBLICATIONS

U.S. patent application Publication No. US 2002/0155341 A1, Published Oct. 24, 2002, by Finkelshtain et al. for a Self–Managing Electrochemical Fuel Cell and Fuel Cell Anode, all pages.
International Search Report for International Application No. PCT/US 01/43417, filed Jun. 11, 2001, all pages.
Ren, Xiaoming et al. Methanol Cross–Over in Direct Methanol Fuel Cells, Electronic and Electrochemical Materials and Devices, MST–11, MS–D429, Los Alamos National Laboratory, NM, all pages.
Fuel Cell, 1992 Fuel Cell Seminar, Program and Abstracts, Nov. 29,—Dec. 2, 1992, Tucson, AZ, pp. 233–236, 461–464.
Maynard, Helen et al., Miniaturized Fuel Cells for Portable Power, Lucent Technologies, 2000.
Sharke, Paul, Pocket–Size PEMs, Mechanical Engineering. Http://www.memagazine.org/contents/current/features/pems/pems.html all pages.
Gottesfeld, Shimshon et al., Polymer Electrolyte Fuel Cells as Potential Power Sources for Portable Electronic Devices, pp. 487–517.

*Primary Examiner*—Charles G. Freay
(74) *Attorney, Agent, or Firm*—Cesari and McKenna, LLP

(57) ABSTRACT

A direct methanol fuel cell (DMFC) system is provided with a pump for pumping methanol into the cell. The pump is driven by carbon dioxide produced by the electro-chemical reaction at the anode of the fuel cell. Because the amount of $CO_2$ generated is proportional to the power generated by the cell, and thus the amount of fuel demanded by the cell, the pump is self-regulating. The system may be integrated using microelectro-mechanical system fabrication techniques.

10 Claims, 3 Drawing Sheets

U.S. PATENT DOCUMENTS

| | | |
|---|---|---|
| 5,759,712 A | 6/1998 | Hockaday |
| 5,766,786 A | 6/1998 | Fleck et al. |
| 5,773,162 A | 6/1998 | Surampudi et al. |
| 5,795,668 A | 8/1998 | Banerjee |
| 5,916,699 A | 6/1999 | Thomas et al. |
| 5,925,476 A | 7/1999 | Kawatsu |
| 5,945,231 A | 8/1999 | Narayanan et al. |
| 5,992,008 A | 11/1999 | Kindler |
| 6,146,781 A | 11/2000 | Surampudi et al. |
| 6,265,093 B1 | 7/2001 | Surampudi et al. |
| 6,296,964 B1 | 10/2001 | Ren et al. |
| 6,322,917 B1 | 11/2001 | Acker |
| 6,350,540 B1 | 2/2002 | Sugita et al. |
| 6,420,059 B1 | 7/2002 | Surampudi et al. |
| 2002/0015872 A1 * | 2/2002 | Surampudi et al. ........... 429/30 |

* cited by examiner

PASSIVELY PUMPED LIQUID FEED FUEL CELL SYSTEM

CROSS REFERENCE TO RELATED APPLICATION

This application is a divisional of U.S. patent application Ser. No. 09/717,754, filed on Nov. 21, 2000, entitled PASSIVELY PUMPED LIQUID FEED FUEL CELL SYSTEM, which issued as U.S. Pat. No. 6,645,655 on Nov. 11, 2003.

BACKGROUND OF THE INVENTION

1. Field of the Invention

The present invention relates generally to the field of fuel cells and, more specifically, to a direct methanol fuel cell system in which carbon dioxide generated by the electro-chemical reaction is used to drive a pump which pumps fuel into the system.

2. Background Information

Fuel cells are devices in which an electro-chemical reaction is used to generate electricity. A variety of materials may be suitable for use as a fuel, depending upon the materials chosen for the components of the cell. Organic materials, such as methanol or formaldehyde, are attractive choices for fuels due to their high specific energies.

Fuel cell systems may be divided into "reformer based" (i.e., those in which the fuel is processed in some fashion before it is introduced into the cell) or "direct oxidation" in which the fuel is fed directly into the cell without internal processing. Most currently available fuel cells are of the reformer-based type, and their fuel processing requirement limits their application to relatively large applications relative to direct oxidation systems.

An example of a direct oxidation system is the direct methanol fuel cell system or DMFC. In a DMFC, the electro-chemical reaction at the anode is a conversion of methanol and water to $CO_2$, $H^+$ and $e^-$. The hydrogen ions flow through a membrane electrolyte to the cathode, while the free electrons flow through a load which is normally connected between the anode and cathode. The carbon dioxide, which is essentially waste, is separated from the remaining methanol fuel and vented before such fuel is recirculated. At the cathode, oxygen reacts with hydrogen ions and free electrons to form water.

Many DMFC designs rely on a simple gravity feed to draw methanol from a source and introduce it into the anode. Two disadvantages of the gravity feed are that it is difficult to vary the flow of methanol into the fuel cell system in response to changes in demand for power, and operation may be interrupted when the system is moved or oriented such that fuel does not flow smoothly. These are significant disadvantages in applications that have a variable load or which are expected to operate in situations where orientation is variable, such as consumer electronic devices, in which DMFCs may be candidates to replace batteries as the power source. Other DMFC designs rely on motorized pumps to pump the methanol into the cell. However, the use of such pumps may bring intolerable increases in size or weight, and will increase the cost of manufacturing and cost of operation due to the electricity or other energy needed to drive the pump. The parasitic power loss used to drive the pump decreases efficiency and will therefore decrease the operation time of the system, and decrease the effective output of such a system.

SUMMARY OF THE INVENTION

The present invention provides a fuel cell system in which fuel is circulated by a pump driven by a gas produced naturally as part of the electro-chemical reaction. In a preferred embodiment, a fuel cell system is provided in which the methanol fuel is pumped by a pump driven by carbon dioxide generated at the anode. The pump receives methanol fuel from a source and water from a gas separator which separates the effluent from the cathode into water and air. Effluent from the anode is directed through another gas separator which separates methanol and water as liquids from the carbon dioxide gas. The separated liquids and gas are then passed to the fuel pump where the $CO_2$ is used to drive the pump.

Because the amount of $CO_2$ generated by the fuel cell is proportional to the power generated and, in turn, the demand for fuel, the fuel pump is self-regulating. That is, as more power is demanded, more $CO_2$ is produced, which results in the fuel pump delivering more fuel to the cell. Conversely, as power demand decreases, less $CO_2$ is produced by the fuel cell, which in turn decreases the amount of fuel pumped to the cell. As the $CO_2$ used to drive the pump is produced naturally as part of the fuel cell's operation, there is no parasitic power loss caused by the pump's operation, and the fuel cell system's operating time is not decreased. In addition, all or most of the components of the system may be fabricated using microelectromechanical system techniques, thus providing a compact, highly integrated system.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
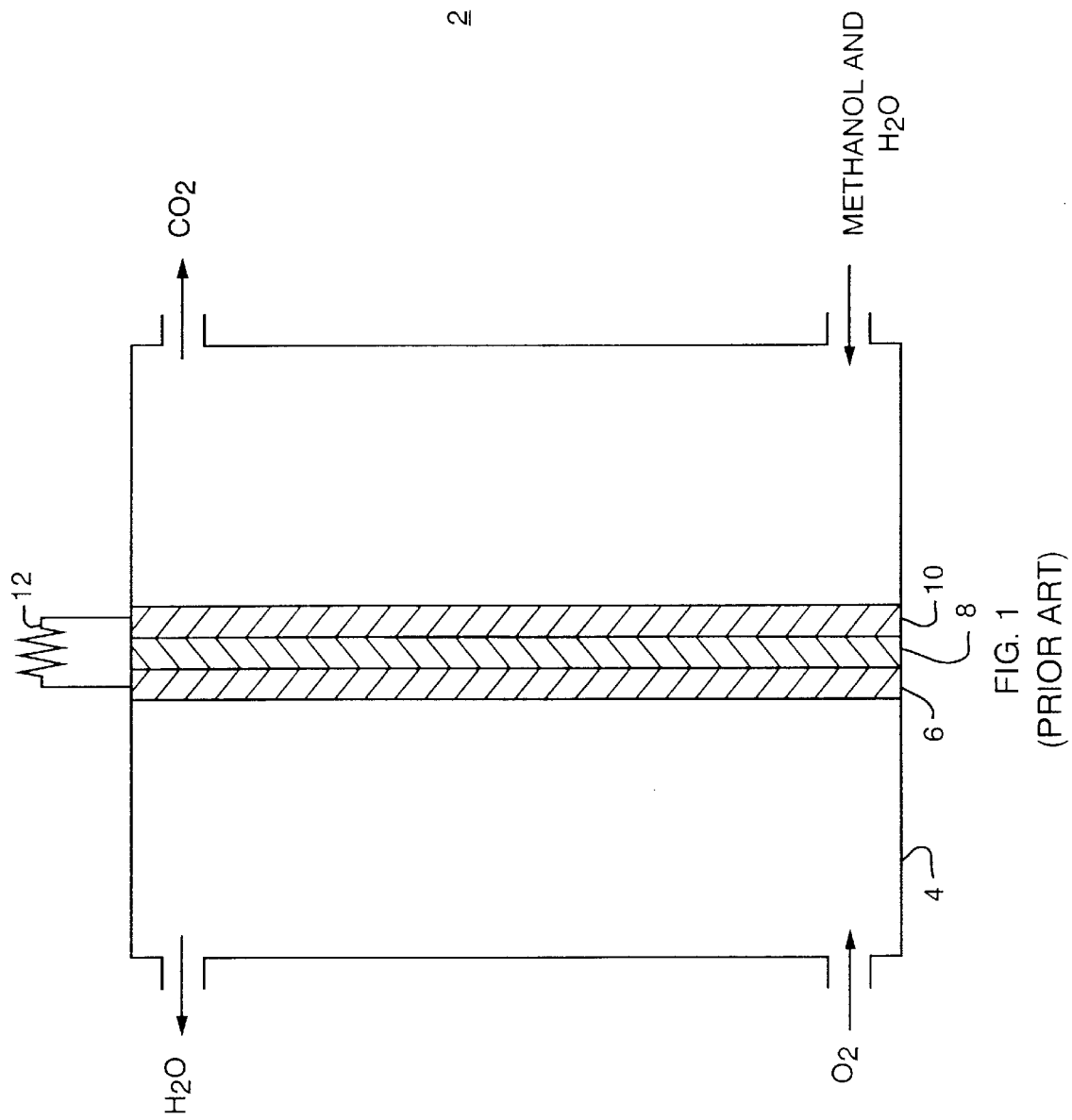
FIG. 1 is a block diagram of a direct methanol fuel cell known in the prior art.

FIG. 1 shows a conventional direct methanol fuel cell 2 in which a housing 4 encloses a cathode 6, a membrane electrolyte 8 and an anode 10. A load 12 is connected across cathode 6 and anode 10. Methanol and water are introduced into the anode side of housing 4 while oxygen is introduced into the cathode side of the housing. The source of the oxygen is preferably ambient air, but it should be understood that other sources could be used. As a result of the reactions at the anode and cathode, free electrons flow from anode 10 through load 12 to cathode 6, while hydrogen ions flow from anode 10 through membrane electrolyte 8 to cathode 6. So long as the reactions continue, a current is maintained through load 12.

Figure 2:
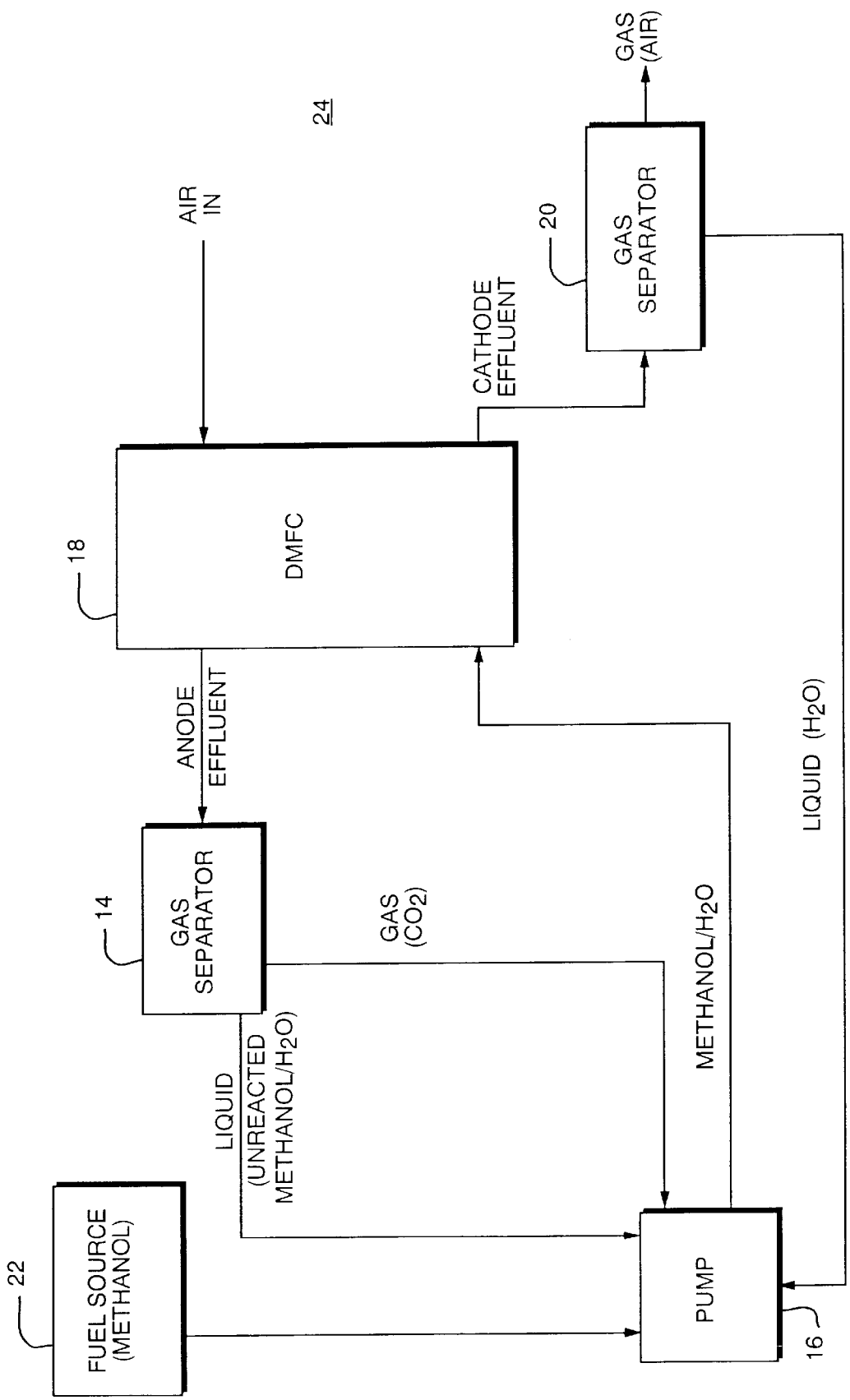
FIG. 2 is a schematic diagram of a passively-pumped, direct methanol fuel cell system constructed in accordance with a preferred embodiment of the present invention.

FIG. 2 shows a passively-pumped, direct methanol fuel cell system 24 constructed in accordance with one aspect of the invention. A fuel source 22 contains fuel (methanol) which is supplied to a pump 16. Pump 16 is coupled to a first gas separator 14, a direct methanol fuel cell 18, and a second gas separator 20. Gas separator 14 receives effluent from the anode of fuel cell 18 and separates it into liquid (i.e., unreacted methanol and water) and gas (carbon dioxide) components. The liquid component is supplied to pump 16 for recirculation to fuel cell 18. The gas component is also supplied to pump 16 and is used to drive the pump.

Gas separator 20 receives effluent from the cathode of fuel cell 18 and separates the effluent into liquid (water), which is returned to pump 16 for recirculation to the fuel cell, and gas (air) which is vented to the ambient.

Fuel cell 18 may be constructed in a conventional manner, like that shown in FIG. 1, from a variety of materials which are commercially available and may be constructed using MEMS fabrication techniques, conventional techniques or a combination of both. Similarly, gas separators 14 and 20 may be of a conventional design and constructed using similar techniques. Alternatively, gas separator 20 could also be implemented using a microfluidic tube, a wicking agent or combination thereof which functions to remove liquid effluent and allow it to be evaporated.

Figure 3:
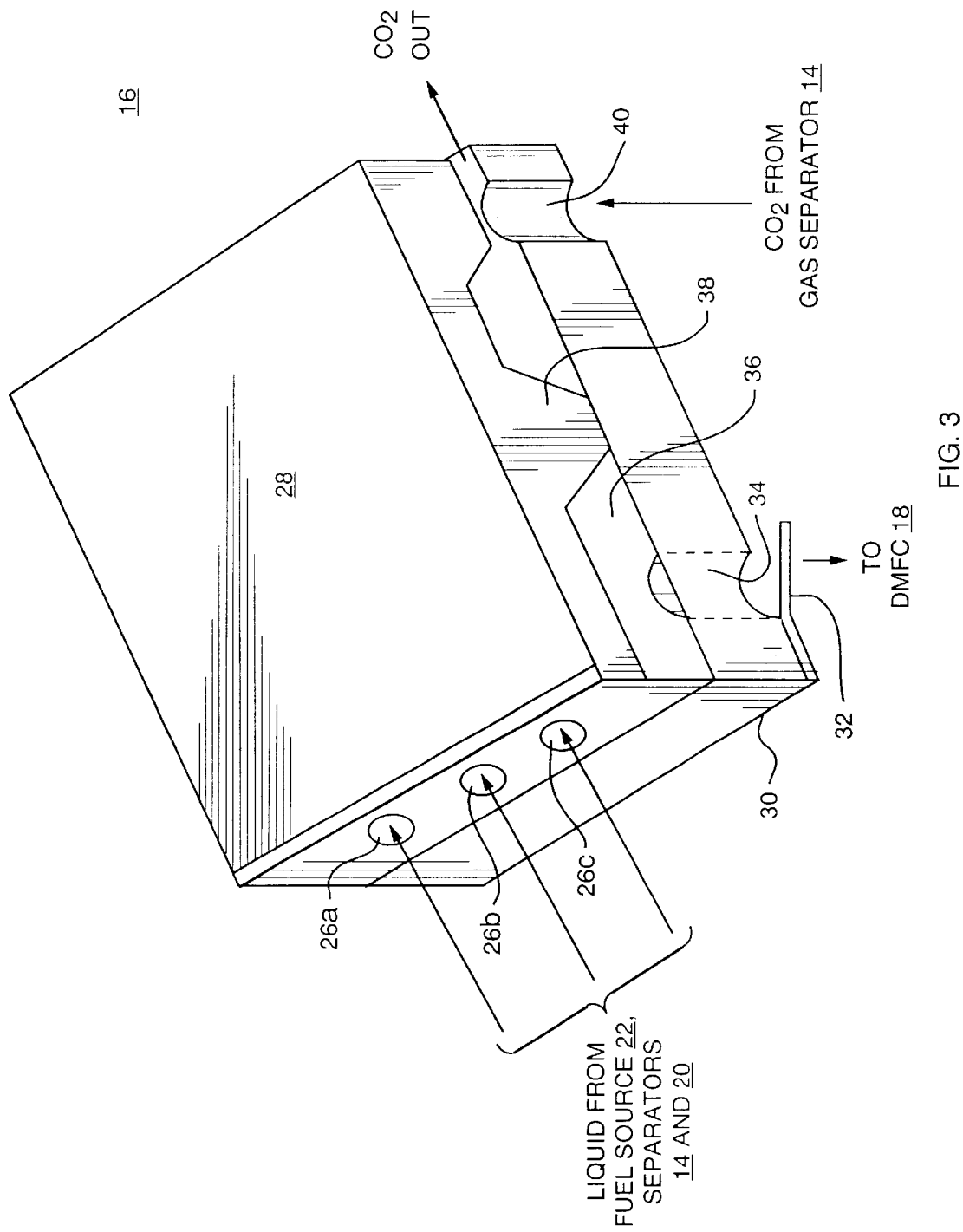
FIG. 3 is a diagram of one embodiment of the pump shown in FIG. 2 in which the pump is constructed using microelectromechanical system (MEMS) fabrication techniques.

FIG. 3 shows one embodiment of pump 16 which is preferably constructed using MEMS fabrication techniques. Three inlets 26a, 26b and 26c admit liquids from fuel source 22 and gas separators 14 and 20 to a pumping chamber 36. An actuator 28 is mounted on a base 30 and pivots about a central support 38. Thus, when $CO_2$ is introduced through an aperture 40 and exerts an upward force on the end of actuator 28 which is proximate to aperture 40, actuator 28 pivots about support 38. The movement of actuator 28 effectively reduces the volume of pumping chamber 36, thereby forcing a methanol/water mixture downward through outlet 34, past a closing flap 32 and on to fuel cell 18.

As the methanol/water mixture is forced out of pumping chamber 36, $CO_2$ is vented along the edge of actuator 28, thus decreasing pressure and allowing actuator 28 to pivot in the opposite direction and return to its original position. At that point, the pumping cycle may begin again.

Inlets 26a, 26b and 26c may be fitted with check valves to prevent backflow of the methanol/water mixture which would undermine effective pumping action. Those inlets may also be fitted with metering valves to permit precise control of the amounts of methanol and water which enter the pumping chamber 36. Such check valves and metering valves are preferably constructed using MEMS fabrication techniques.

It should be understood by those skilled in the art that different types of pumps or combinations of pumps could be used with the invention. For example, a diaphragm or other cantilevered pump, again preferably fabricated using MEMS techniques, could be used in addition to the gas-driven pump described above. In addition, components such as gas separator 14 and pump 16 may be combined into an integrated unit which may reduce the overall size or improve the form factor of the fuel cell system.

It should also be understood that the present invention may be used with fuels other than a methanol/water mixture including, for example, pure methanol, and that gases other than carbon dioxide could be used to drive the pump.

What is claimed is:

1. A fuel pump for use in a fuel cell system comprising:
   one or more inlets through which fuel is received from a fuel source;
   a pumping chamber coupled to said one or more inlets;
   a gas-driven actuator coupled to said pumping chamber and powered by a gas produced by an electrochemical reaction within a fuel cell, said gas-driven actuator being pivotally mounted on a base, and said pumping chamber is enclosed by said actuator, said base, and a pivoting element, and which said one or more inlets admit fuel and/or water or a fuel/water mixture to said pumping chamber when said actuator pivots, whereby the amount of gas produced is directly proportional to demand for power from said fuel cell; and
   one or more outlets, coupled to said pumping chamber, through which fuel is driven from said pumping chamber to said fuel cell.

2. The fuel pump, as defined in claim 1, wherein said gas-driven actuator further comprises:
   said pivoting element being fastened to a centrally disposed axis such that, as gas is produced in said electrochemical reaction, the gas forces one end of said pivoting element in a first direction causing said pivoting element to rotate about said axis which thereby tips the other end of said pivoting element in an opposite direction into said pumping chamber, which reduces the overall available volume of the pumping chamber and forces fuel out of the chamber.

3. The fuel pump, as defined in claim 1, wherein the fuel cell system with which the pump is used includes:
   a direct oxidation fuel cell having an anode, a cathode, and a membrane electrolyte disposed between the anode and the cathode;
   a source of air or oxygen coupled to the cathode; and
   a source of fuel whereby electricity generating reactions are produced at the anode and the cathode and carbon dioxide, being the gas that is released at the anode, drives said gas-driven actuator.

4. The fuel pump, as defined in claim 1, wherein said fuel is a carbonaceous fuel.

5. The fuel pump, as defined in claim 1, wherein said fuel is substantially comprised of methanol.

6. The fuel pump, as defined in claim 1, wherein said fuel pump is constructed using micro-electromechanical (MEMS) fabrication techniques.

7. The fuel pump, as defined in claim 1, wherein said fuel pump is constructed using a combination of MEMS and non-MEMS fabrication techniques.

8. The fuel pump, as defined in claim 3, further comprising a gas separator whereby anode effluent is passed through said gas separator when entering said fuel pump to separate unreacted fuel and water from said carbon dioxide.

9. The fuel pump, as defined in claim 1, wherein said one or more inlets includes a check valve for preventing back flow of fluid out of said pump.

10. The fuel pump, as defined in claim 1, wherein said one or more inlets includes a metering valve for controlling the amount of fuel and water and fuel/water mixture admitted into said pump.

* * * * *